(12) United States Patent
Ferrucci et al.

(10) Patent No.: US 12,417,081 B2
(45) Date of Patent: Sep. 16, 2025

(54) MACHINE-LEARNING ASSISTED NATURAL LANGUAGE PROGRAMMING SYSTEM

(71) Applicant: Elemental Cognition Inc., New York, NY (US)

(72) Inventors: David A. Ferrucci, Wilton, CT (US); Marcello Balduccini, Wynnewood, PA (US); Andrew E. Beck, Westport, CT (US); Gregory Burnham, Brooklyn, NY (US); Gregory Gelfond, Omaha, NE (US); Clifton James McFate, Norwalk, CT (US); David Nachman, New York, NY (US); Joseph Nelson Rushton, Lubbock, TX (US)

(73) Assignee: Bridgewater Associates EC IP, LLC, Westport, CT (US)

( * ) Notice: Subject to any disclaimer, the term of this patent is extended or adjusted under 35 U.S.C. 154(b) by 288 days.

(21) Appl. No.: 18/114,218

(22) Filed: Feb. 24, 2023

(65) Prior Publication Data
US 2023/0305822 A1  Sep. 28, 2023

Related U.S. Application Data

(60) Provisional application No. 63/314,281, filed on Feb. 25, 2022.

(51) Int. Cl.
*G06F 8/41* (2018.01)
*G06F 8/30* (2018.01)
*G06N 20/00* (2019.01)

(52) U.S. Cl.
CPC .................. *G06F 8/41* (2013.01); *G06F 8/31* (2013.01); *G06N 20/00* (2019.01)

(58) Field of Classification Search
None
See application file for complete search history.

(56) References Cited

U.S. PATENT DOCUMENTS

| 11,481,559 B1 * | 10/2022 | Asefi ........................ G06F 9/543 |
| 2015/0100588 A1 * | 4/2015 | Allen .................... G06F 16/243 |
| | | 707/748 |

(Continued)

FOREIGN PATENT DOCUMENTS

CN       117555518 A  *  2/2024

*Primary Examiner* — Philip Wang
*Assistant Examiner* — Rongfa P Wang
(74) *Attorney, Agent, or Firm* — Lee & Hayes, P.C.

(57) ABSTRACT

A natural language programming system may configure a machine learning (ML) model to translate natural language descriptions into constrained language statements. The constrained language statements may express the natural language descriptions using a constrained subset of natural language. The constrained subset of natural language includes words with unambiguous semantics and with meaning that has a clear and singular interpretation. The constrained language statements with unambiguous semantics enable construction of valid statements in high-level "English-like" executable programming language. With the present system, a user does not need to learn a new programming language but rather learn to constrain their natural language statements to a subset of the natural language ("constrained language") and to generate executable programs.

20 Claims, 8 Drawing Sheets

(56) References Cited

U.S. PATENT DOCUMENTS

| | | | | |
|---|---|---|---|---|
| 2015/0242396 | A1* | 8/2015 | Su | G06F 8/42 |
| | | | | 704/2 |
| 2021/0397418 | A1* | 12/2021 | Nikumb | G06F 40/295 |
| 2022/0067037 | A1* | 3/2022 | Ranganathan | G10L 15/22 |
| 2022/0108079 | A1* | 4/2022 | Roisman | G06F 40/154 |
| 2022/0180056 | A1* | 6/2022 | Hong | G06F 9/547 |
| 2022/0253607 | A1* | 8/2022 | Aubineau | H04L 51/02 |
| 2022/0358125 | A1* | 11/2022 | Scholak | G06F 16/24522 |
| 2022/0374420 | A1* | 11/2022 | Relan | G06F 16/24522 |
| 2023/0356089 | A1* | 11/2023 | Kurabayashi | A63F 13/79 |

* cited by examiner

MACHINE-LEARNING ASSISTED NATURAL LANGUAGE PROGRAMMING SYSTEM

CROSS-REFERENCE TO RELATED APPLICATION

The present application is a nonprovisional of and claims priority to U.S. Provisional Patent Application No. 63/314,281, filed on Feb. 25, 2022, which is incorporated herein by reference in its entirety.

BACKGROUND

Domain-specific systems typically rely on business analysts or domain experts to use natural language descriptions (e.g., English) to describe the dynamics of how the domain-specific system works. For example, a domain expert may define objects, entities, and relationships associated with the domain and further define rules and constraints that govern their behavior. These natural language descriptions, when understood, may be used by a person to perform operations for the system. The operations may include answering questions about the system, diagnosing problems with the system, configuring valid instances, and/or controlling the system to achieve specific goals.

However, it is expensive to have humans perform the operations for such a domain-specific system. Accordingly, programmers may be hired to implement an interactive computer program to perform the operations for the described system. To implement an "operational program" as an executable software program, one or more human programmers would need to interpret the original natural language descriptions and use their knowledge and programming skills to write the software program. Especially for a complex system, the implementation may take significant skill and effort and may also be time-consuming and expensive.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
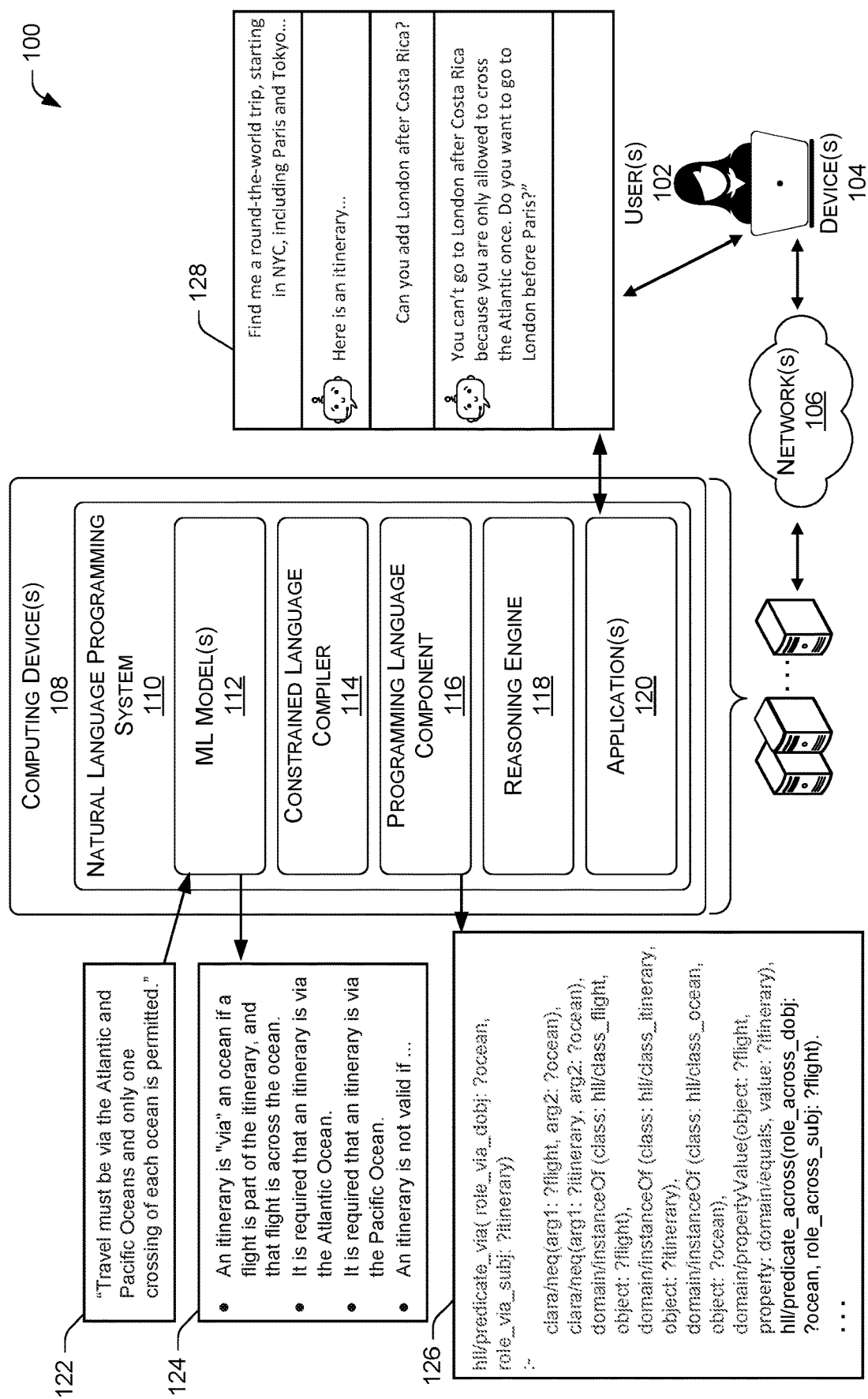
FIG. 1 illustrates an example system of a natural language programming system including a model to translate natural language descriptions into constrained language statements.

This disclosure is directed, in part, to a natural language programming system, including a model to translate natural language descriptions into constrained language statements to enable a user to generate an executable software program from the natural language descriptions. The present system may train a data-driven machine learning (ML) model to enable the user to write valid statements in high-level "English-like" executable programming language. It is to be appreciated that although the instant application includes many examples and illustrations of using "English" as the language for the natural language programming system, the natural language programming system is configured to be used with any natural language (e.g., Spanish, French, etc.).

In various examples, the system may provide a natural language programming tool and associated components to allow a domain user to write executable software program by using natural language descriptions. The natural language descriptions may include natural language documents, natural language statements, and/or interactive user input. The system may generate machine learning (ML) models ("ML models" or "translator models") to translate natural language input into constrained language output. The ML models may be generated by using labeled data. The labeled data ("labeled data" or "training data") may include natural language descriptions paired with corresponding constrained language statements. In the present system, the constrained language is a constrained subset of natural language, which allows the constrained language statements to be read and understood as plain English. Additionally, the constrained subset of natural language allows the system to define specific words as having unambiguous meanings. Accordingly, the system generates constrained language statements that are semantically unambiguous.

In some examples, the system may receive natural language input to process. The system may generate one or more models to process the input natural language (NL) document. The NL document may describe objects, relationships between objects, classes of objects, and/or the ways in which the objects interact. The NL document may also include rules and constraints that govern the behavior of the objects. As described herein, the system may use a model to translate natural language input into constrained language output.

In various examples, the system may output an executable computer program called a "reasoner" with an application programming interface (API). In some examples, the system may include a constrained language compiler to compile the constrained language output into an executable programming language. In various examples, the constrained language compiler may generate the executable computer program called the "reasoner" with API. In various examples, the API may include a set of technical interfaces that other computer programs can call and/or use. The reasoner API may be configured to enable: (1) user input of assertions naming properties, relationships, conditions, rules, and constraints about a specific set of objects and their relationships; (2) posing of questions; and (3) the collection of answers to posed questions that are logically implied by the original NL document.

In some examples, the system may include components to translate the NL document to constrained language statements. In various examples, the system may use supervised machine learning. The system may compile the constrained language into an executable programming language using the constrained language compiler and then run the executable programming language in the reasoning engine. The reasoning engine may present an API rendered via any technical interface (e.g., REST, GraphQL, etc.) for any computer application to assert specific objects, properties, and/or relationships. The reasoning engine may ask questions about the implications of those statements as logically implied by the original NL document.

In various examples, the system may include a dialog component to generate interactive dialog to guide the user by prompts or other interactions to verify the translated statements based on the input NL document. The dialog component may prompt the user to verify the logical intent of natural language input by presenting the corresponding translated constrained language output.

As described herein, the present system may generate a "translator" model to map natural language input into constrained language output. By translating natural language into a constrained subset of natural language that is semantically unambiguous, the system ensures that the user-provided natural language input may deterministically map to valid constrained language statements. The valid constrained language statements may be represented by unambiguous semantic structures, which are readily machine-readable. The system may compile the semantic structures of the constrained language statements into programming language representation. The system may send the programming language representation to the downstream application for the application to process and/or use.

The present natural language programming system provides a number of advantages over traditional programming systems, such as allowing a user to write executable software programs without programmer-specific training. As described herein, the system may train a machine learning (ML) model to enable the user to write valid statements in high-level "English-like" executable programming language. With the present system, the user does not need to learn a new programming language but rather learn to constrain their current natural language use to a constrained subset of English ("constrained language") to generate the executable software programs. Because constrained language remains a natural language and is a limited subset of grammatical English, the constrained language reads like documents written in English and is typically understandable by English-speaking users. This process of creating executable software programs with the present system not only reduces the cost but is also more efficient.

This system employs techniques from artificial intelligence, such as knowledge representation and reasoning (KRR), machine learning (ML), large language models (LLMs), and transformer-based neural networks. In addition, it employs techniques from natural language processing (NLP), such as syntactic parsing, predicate-argument structure (PAS), entity type assignment, co-reference analysis, and statistical techniques such as distributional semantics (e.g., latent semantic analysis, random indexing, and topic modeling).

Examples of a natural language understanding engine and associated components, including knowledge representation and reasoning engine, knowledge induction engine, knowledge accumulation engine, semantic parser, and other techniques, are discussed in U.S. Pat. No. 10,606,952, filed Jun. 24, 2016. Examples of a natural language understanding engine and associated components, including a knowledge acquisition engine, semantic parser, and other techniques, are discussed in U.S. patent application Ser. No. 17/021,999, filed Aug. 8, 2020. Examples of a natural language understanding engine and associated components, including a reasoning engine, semantic parser, inference engine, and other techniques, are discussed in U.S. patent application Ser. No. 17/009,629, filed Aug. 1, 2020. application Ser. Nos. 17/021,999 and 17/009,629 and U.S. Pat. No. 10,606,952 are herein incorporated by reference, in their entirety, and for all purposes.

The techniques and systems described herein may be implemented in a number of ways. Example implementations are provided below with reference to the following figures.

Illustrative Environment

FIG. 1 illustrates an example system 100 of a natural language programming system including a model to translate natural language descriptions into constrained language statements. The system 100 may include user(s) 102 that utilizes device(s) 104, through one or more network(s) 106, to interact with the computing device(s) 108. In some examples, the network(s) 106 may be any type of network known in the art, such as the Internet. Moreover, the computing device(s) 108 and/or the device(s) 104 may be communicatively coupled to the network(s) 106 in any manner, such as by a wired or wireless connection.

The user(s) 102, via the device(s) 104, may interact with the computing device(s) 108. The user(s) 102 may include any number of human operators and may include any application users, content writers, developers, analysts, engineers, crowdsourcing network members, and the like. In various examples, the user(s) 102 may include domain experts, analysts, or end-users. In additional examples, the user(s) 102 may be part of an organized crowdsourcing network, such as the Mechanical Turk™ crowdsourcing platform. In examples, the user(s) 102 may include an application user who is being prompted by an application to provide input text. The application may be integrated with any computer system that is configured to interact with the user(s) 102 by natural language input. The computer system may include, but is not limited to, a network access system, logistics system, warehouse management system, and the like.

The user(s) 102 may operate the corresponding device(s) 104 to perform various functions associated with the computing device(s) 108, which may include at least some of the operations and/or components discussed herein with respect to the computing device(s) 108. The user(s) 102 may operate the device(s) 104 using any input/output devices, including but not limited to mouse, monitors, displays, augmented glasses, keyboard, cameras, microphones, speakers, and headsets. In various examples, the computing device(s) 108 and/or the device(s) 104 may include a text-to-speech component that may allow the computing device(s) 108 to conduct a dialog session with the user(s) 102 by verbal dialog. It is to be appreciated that any discussion of receiving user input, as discussed herein, including typing input text and/or selection of templates or any UI elements, may be received by verbal dialog. The user(s) 102 may utilize device(s) 104 to interact with the computing device(s) 108 in any setting including, but not limited to, a site (i.e., a website), a standalone application, an application programming interface (API), a self-service interface, a self-service portal, and the like.

The device(s) 104 may be or include any suitable type of computing device(s), including, without limitation, a mainframe, a workstation, a personal computer (PC), a laptop computer, a tablet computer, a personal digital assistant (PDA), a cellular phone, a media center, an embedded system, or any other sort of device or devices.

The device(s) 104 may receive content from the computing device(s) 108, including user interfaces to interact with the user(s) 102. In some examples, the components of the computing device(s) 108 are transmitted to and stored on the device(s) 104 as a standalone application and/or as an application programming interface (API). In various examples, the user(s) 102 may include any number of human collaborators who are engaged by the device(s) 104 to interact with the computing device(s) 108 and to verify the functions of one or more components of the computing device(s) 108. For instance, a human collaborator of the device(s) 104 may interact with the natural language programming system 110, and the device(s) 104 may receive a trip itinerary model that the system is configured to work on. In the present example, the user(s) 102 may be presented with prompts via a user interface, and the system may ask questions about travel destinations.

The computing device(s) 108 may include any components that may be used to facilitate interaction between the computing device(s) 108 and the user(s) 102. For example, the computing device(s) 108 may include a natural language programming system 110 and associated components. The computing device(s) 108 may be or include any suitable type of computing device(s), including, without limitation, a mainframe, a workstation, a personal computer (PC), a laptop computer, a local server, a network of computing devices, crowd computing, a cloud server, or any other sort of server device or devices.

The natural language programming system 110 may engage with the user(s) 102 through interactive dialogs. The natural language programming system 110 may use one or more models and/or natural language parsers to process the input text from the user(s) 102. The natural language programming system 110 may perform natural language to constrained language mapping for the system. The natural language programming system 110 may include ML model(s) 112, a constrained language compiler 114, a programming language component 116, a reasoning engine 118, and application(s) 120.

In some examples, the natural language programming system 110 may receive natural language descriptions and generate an executable program. As will be described with greater detail herein with respect to FIG. 2, the natural language programming system 110 may receive as input natural language description associated with a domain. The system may comprehend the natural language and automatically output an efficient "operational program." In particular, the operational program may answer questions about the system, diagnose problems with the system, configure new instances of a valid system, or control the system to achieve specific goals. It is to be understood that the natural language programming system 110 and associated components and processes described herein may be generalized to any language and/or domain and not just to the specific examples described herein.

In some examples, the natural language programming system 110 may include components to translate the NL document to constrained language statements. In various examples, the system may use supervised machine learning. The system may compile the constrained language statements, using the constrained language compiler, into executable programming language and then run the executable programming language in the reasoning engine.

The natural language programming system 110 may receive the natural language input (e.g., NL description, NL document, user input, etc.) from any sources, including a knowledge database, a domain library, an application, the user(s) 102, and the like. The natural language programming system 110 may use one or more models and/or natural language parsers to process the natural language content and perform natural language understanding processes. In some examples, the natural language programming system 110 may generate a prompt about an unknown concept in the natural language content to acquire knowledge from the user(s) 102. The natural language programming system 110 may conduct a dialog session with the user(s) 102 via a dialog manager and/or the application(s) 120, and receive input text from the user(s) 102.

The ML model(s) 112 may receive and translate natural language statements associated with a program domain into constrained language statements. In some examples, the ML model(s) 112 may receive natural language input from the user(s) 102 and translate the input into constrained language statements. As will be described herein with respect to FIG. 2, the ML model(s) 112 may use the constrained language compiler 114, the programming language component 116, and the reasoning engine 118 to continuously guide user input and presenting prompts. The ML model(s) 112 and/or associated components may generate constrained language statements.

The ML model(s) 112 translates a natural language expression to constrained language statements to limit the expression to sentences that can have precise and logical interpretations. The constrained language is a natural language subset that is a subset of English designed to have precise, unambiguous interpretation in an underlying programming language.

The constrained language compiler 114 may unambiguously compile constrained language statements to a single, executable program. The present system may encode the constrained language compiler 114 with rules that translate constrained language to the programming language.

The constrained language compiler 114 may output executable programming language and/or a "reasoner" with an API. The reasoner API may include UI elements to interact with the user(s) 102. As described herein, the constrained language was designed to enable the expression of a very rich set of logical concepts found in both formal logical programming language as well as in natural language. The logical concepts may include but is not limited to: objects, classes of object, subclasses of classes, taxonomies/hierarchies, properties of objects, relationships between objects, qualities, implicatures, conditions, defaults, exceptions, randomness, normality, and the like. The constrained language compiler 114 may present a prompt to request assertion from the user(s) 102 by user input.

In some examples, the constrained language compiler 114 may receive a prompt from the system and the prompt may include any form of a request for information including questions about natural language input, instructions to define one or more objects, classes of objects, subclasses of classes, taxonomies/hierarchies, properties of objects, relationships between objects, qualities, implicatures, conditions, defaults, exceptions, randomness, and the like. To initiate interaction with the user(s) 102, the constrained language compiler 114 may generate a reasoner with an API. The reasoner API may be configured to enable: (1) user input of assertions naming properties, relationships, conditions, rules, and constraints about a specific set of objects and their relationships; (2) posing of questions; and (3) the collection of answers to posed questions that are logically implied by the original NL document.

In some examples, the ML model(s) 112 and the constrained language compiler 114 may present domain modeling interface and/or selectable icons for user input. The constrained language compiler 114 and the ML model(s) 112 may receive natural language description from the user and may present the translated constrained language in the user interface for confirmation or corrections. In the context of the present disclosure, the domain modeling interface refers to a UI element that presents suggested input for modeling a domain to prompt the user(s) 102 for selection and may, at times, include selectable tasks based on the domain data received. The constrained language compiler 114 may determine that the domain data includes metadata associated with additional information (e.g., definitions, examples, etc.) about the template and/or one or more slots labeled with field types. Based on the domain data received, the constrained language compiler 114 may generate UI elements including selectable templates, blank text fields for slots labeled with field types, and selectable icons to link additional information about the template. In some examples, the constrained language compiler 114 may present different UI elements including a selectable task with one or more selectable icons to allow the user(s) 102 to explore different information associated with the modeling, as illustrated and discussed in FIGS. 5 and 6, below.

The constrained language compiler 114 may present a partial domain model with one or more slots to guide input text. As described herein, the constrained language compiler 114 may display incomplete models associated with a domain to initiate user interaction.

The programming language component 116 may define a programming language for the domain. For example, a type of logic programming language like Prolog and Answer-Set Prolog. In some examples, the executable programming language can be executed on a computer by an "interpreter," and all answers entailed by the program can be generated by the interpreter running the program on the computer. The programming language component 116 may include a logic programming language with novel semantics that can be executed on the computer by the interpreter (e.g., reasoning engine 118).

The programming language component 116 may not necessarily be defined by the executable software program, as described herein, and need not be a logic programming language, but the design of a compiler that translates constrained language to an executable programming language would be a more difficult task if the natural language and the programming language were not carefully aligned in terms of their intended logical meaning. The present system may align the constrained language and programming language. In particular, the constrained language compiler 114 may include an executable logic programming language that can directly represent the logical semantics of a NL like English.

The reasoning engine 118 may receive programming language representations to generate questions and answers. In some examples, the reasoning engine 118 may include an interpreter and/or a computer program designed to efficiently interpret or execute/run executable programming language. In some examples, the NLU engine may include a Prolog or Python interpreter but may also include a component designed to interpret executable programming language programs.

The reasoning engine 118 may provide certain innovations over a Prolog interpreter or even an Answer-Set Prolog interpreter but may play the general role of the programming language interpreter in this invention. The present system is based at least in part on the designed relationship between the constrained language and English; between the constrained language and system programming language; and further based on the system programming language being an executable programming language.

The application(s) 120 may run the executable programming language and interface with the user(s) 102. In some examples, the application(s) 120 may execute the executable programming language to help guide the user(s) 102 to perform operations and or perform problem-solving tasks.

In a non-limiting example, the example system 100 may receive the example natural language description 122, and the ML model(s) 112 may translate the NL into the example constrained language statements 124. The constrained language compiler 114 may compile the example constrained language statements 124 into the example executable programming language 126.

As described herein, the application(s) 120 may present a user interface to interact with the user(s) 102. The constrained language compiler 114, the programming language component 116, and the reasoning engine 118 may encode the rules from the example executable programming language 126. The application(s) 120 may receive the rules and/or the example executable programming language 126 and may present the example UI 128 to prompt input from the user(s) 102 via the device 104. As depicted on the example UI 128, the user(s) 102 is planning a round-the-world trip, starting in NYC, including Paris and Tokyo. In response to the user(s) 102 requesting to add London after Costa Rica, the reasoning engine 118 may determine that violates a rule "only one crossing of each ocean is permitted." The reasoning engine 118 determined an alternative trip plan that would not violate the rules and prompts the user with, "Do you want to go to London before Paris?"

Figure 2:
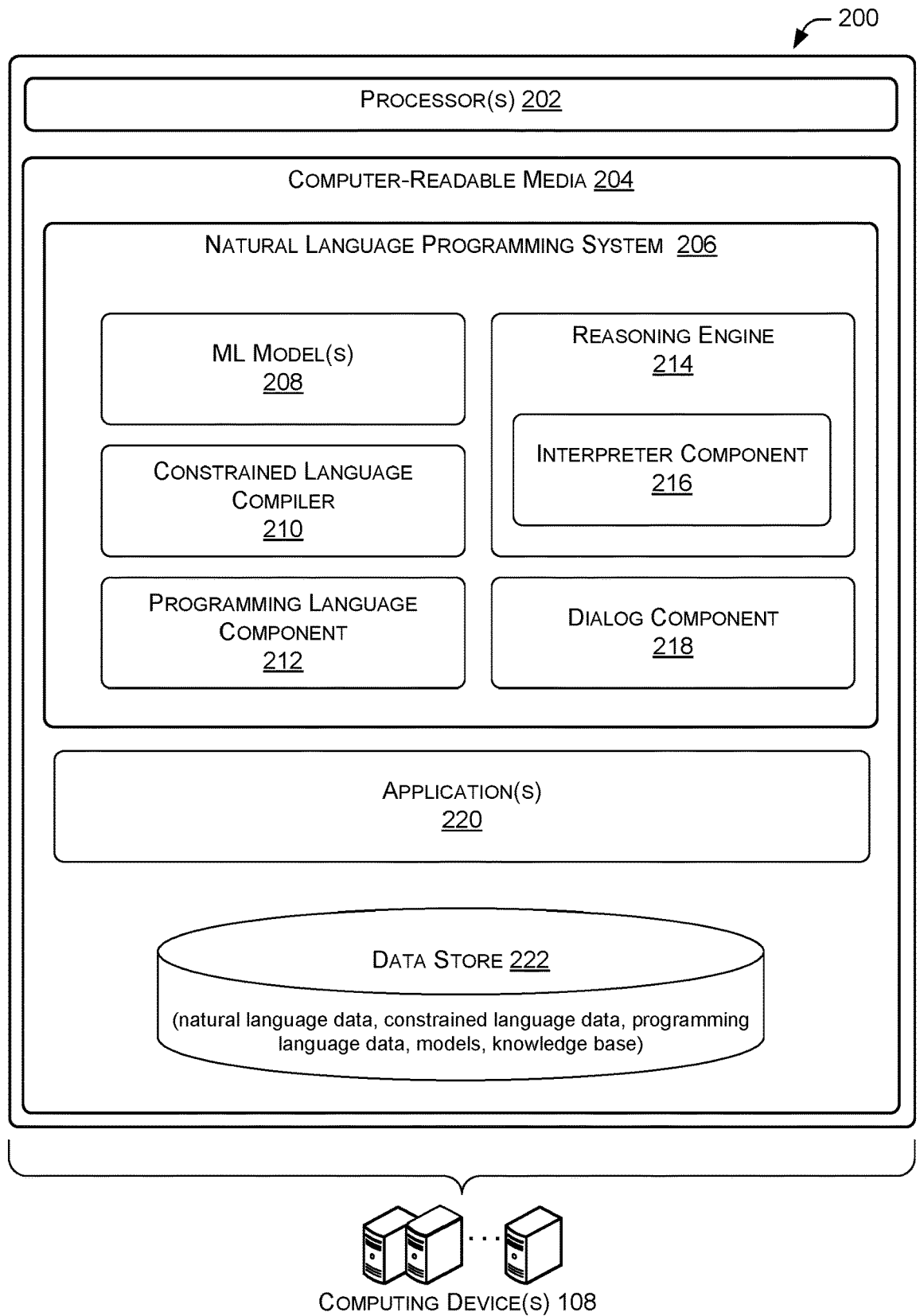
FIG. 2 is a block diagram of an example computing architecture associated with the system of FIG. 1.

FIG. 2 is a block diagram of an illustrative computing architecture 200 of the computing device(s) 108 of FIG. 1. The computing architecture 200 may be implemented in a distributed or non-distributed computing environment.

The computing architecture 200 may include one or more processors 202 and one or more computer-readable media 204 that store various modules, data structures, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store natural language programming system 206 and associated components, application(s) 220, and data store 222, which are described in turn. The components may be stored together or in a distributed arrangement.

The natural language programming system 206 may include the ML model(s) 208, a constrained language compiler 210, a programming language component 212, a reasoning engine 214, an interpreter component 216, and a dialog component 218. The natural language programming system 206 may leverage its components, the application(s) 220 and the data store 222, to build and evolve the representation structures and domain database. The natural language programming system 206 may collect natural language data, domain data, source data, and annotated and unannotated corpora as needed by the components. The natural language programming system 206 may use a database of natural language data to map statements in natural language expressions to structured representations.

In some examples, the natural language programming system 206 and/or associated components may generate a semantic frame structure to represent a natural language statement acquired by user input. The natural language programming system 206 may construct a partial semantic frame structure to express a current incomplete domain model and may continuously build the partial domain model structures. In response to user input for submitting a domain model as complete, the natural language programming system 206 may submit the corresponding programming language representation structure to a downstream application(s) 220.

The ML model(s) 208 may translate natural language statements to constrained language statements. The ML model(s) 208 may receive natural language input from the user(s) 102 and translate the input to constrained language output.

The ML model(s) 208 may translate natural language into constrained language to limit its expression to sentences that can have a precise, logical interpretation. The constrained language is a natural language subset that is a subset of English designed to have precise, unambiguous interpretation in an underlying programming language. In some examples, the constrained language includes a subset of English that is designed to provide unambiguous logical interpretation and/or unambiguous semantics.

The ML model(s) 208 may train models needed by the components and/or for a downstream application. In additional examples, the ML model(s) 208 may receive natural language description and may process the natural language description to generate a structured representation of the natural language description. The ML model(s) 208 may generate a prompt about an unknown concept in the natural language description to acquire knowledge from the user(s) 102. In additional examples, the ML model(s) 208 may receive domain-specific natural language description for a downstream application and may process the domain-specific natural language description to generate a structured representation of the natural language description. The ML model(s) 208 may generate a prompt about an unknown concept in the domain-specific natural language description to acquire knowledge from the user(s) 102.

In various examples, the system may generate, by training and/or prompting, one or more ML model(s) 208 using labeled data as training data. Machine learning generally involves processing a set of examples (called "training data" or "labeled data") to generate ("train" or "prompt") one or more ML model(s) 208. The model(s) 208, once generated, is a learned mechanism that can receive new data as input and estimate or predict a result as output. Additionally, the model(s) 208 may output a confidence score (also referred herein as "confidence," "confidence level," "statistical probability," or "accuracy") associated with the predicted result. The confidence score may be determined using probabilistic classification and/or weighted classification. For example, a trained ML model(s) 208 can comprise a classifier that is tasked with classifying unknown input as one of the multiple class labels. In additional examples, the model(s) 208 can be retrained with additional and/or new training data labeled with one or more new types (e.g., rules) to teach the model(s) 208 to classify unknown input by types that may now include the one or more new types. In various examples, a trained ML model(s) 208 can comprise a classifier that is tasked with mapping natural language to constrained language.

In additional and/or alternative examples, the ML model(s) 208 may include a generative model, which is a statistical model that can generate new data instances. In various examples, the statistical model may use neural network models to learn an algorithm to approximate the model distribution. In some examples, the generative model may be trained to receive input text and a frame-triggering span and may output a full or partial frame semantic parse of the input text. In an additional example, the generative model may output the accuracy associated with the frame sense by the generative model.

In the context of the present disclosure, the input may include, text that is to be handled according to a semantic concepts, and the trained ML model(s) 208 may be tasked with receiving an input text and outputting a semantic template that defines a semantic frame for the trigger concept.

In some examples, the trained ML model(s) 208 may classify an input text with a trigger concept to one of the semantic frames and determine an associated confidence score (e.g., accuracy). In various examples, if the trained ML model(s) 208 has low confidence (e.g., a confidence score is at or below a low threshold) for a frame sense to span to an input text, this low confidence may result in the system determining to not generate an associated frame and/or template. An extremely high confidence score (e.g., a confidence score is at or exceeds a high threshold) may indicate the semantic frame is likely the correct frame sense for an input text, and the template associated with the semantic frame may be ranked higher on a template selection list. After the generated templates have been corrected by user input, the data with the semantic frames may be labeled and annotated by a user, the data may be used as additional training data to retrain the model(s) 208. Thus, the system may retrain the ML model(s) 208 with the additional training data to generate the new ML model(s) 208. The new ML model(s) 208 may be applied to new frames, rules, and/or parsers as a continuous retraining cycle to improve the ML model(s) 208 and associated components, the natural language programming system 206, the constrained language compiler 210, and/or the programming language component 212.

The ML model(s) 208 may represent a single model or an ensemble of base-level ML models and may be implemented as any type of model(s) 208. For example, suitable ML model(s) 208 for use with the techniques and systems described herein include, without limitation, tree-based models, k-Nearest Neighbors (kNN), large language models (LLMs), transformer-based neural networks, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, linear discriminant analysis (LDA), generative models, discriminative models, or an ensemble thereof. An "ensemble" can comprise a collection of the model(s) 208 whose outputs are combined, such as by using weighted averaging or voting. The individual ML models of an ensemble can differ in their expertise, and the ensemble can operate as a committee of individual ML models that are collectively "smarter" than any individual machine learning model of the ensemble.

In various examples, the ML model(s) 208 and/or one or more associated components may be part of a standalone application that may be installed and stored on the device(s) 104. The ML model(s) 208 may determine, by applying the ML model to the natural language statements, constrained language statements, wherein the ML model is configured to receive input NL statements and output constrained language statements.

The constrained language compiler 210 may output a reasoner with an API. As described herein with respect to the constrained language compiler 114 of FIG. 1, the constrained language compiler 210 may generate a UI including UI elements to interact with the user(s) 102. The constrained language compiler 210 may present the updated template(s) in the templates panel to guide the user input to iteratively refine the generated template.

The constrained language compiler 210 may output executable programming language and/or a "reasoner" with an API. The reasoner API may include UI elements to interact with the user(s) 102. The constrained language was designed to enable the expression of a very rich set of logical concepts found in both formal logical programming language as well as in natural language, including but not limited to: objects, classes of object, subclasses of classes, taxonomies/hierarchies, properties of objects, relationships between objects, qualities, implicatures, conditions, defaults, exceptions, randomness, normality, and the like. The constrained language compiler 210 may present a prompt to request assertion from the user(s) 102 by user input. The constrained language compiler 210 may receive the prompt from the system and the prompt may include any form of a request for information including questions about natural language input, instructions to define one or more of objects, classes of object, subclasses of classes, taxonomies/hierarchies, properties of objects, relationships between objects, qualities, implicatures, conditions, defaults, exceptions, randomness, and the like. To initiate interaction with the user(s) 102, the constrained language compiler 210 may generate a reasoner with an API.

In some examples, the ML model(s) 208 and the constrained language compiler 210 may present a modeling panel and/or selectable icons for user input. The constrained language compiler 210 and the ML model(s) 208 may receive natural language description from the user and may present the translated constrained language in the user interface for confirmation or corrections. In the context of the present disclosure, the modeling panel refers to a UI element that presents suggested input for modeling a domain to prompt the user(s) 102 for selection and may, at times, include selectable tasks based on the domain data received. The constrained language compiler 210 may determine that the domain data includes metadata associated with additional information (e.g., definitions, examples, etc.) about the template and/or one or more slots labeled with field types. Based on the domain data received, the constrained language compiler 210 may generate UI elements including selectable templates, blank text fields for slots labeled with field types, and selectable icons to link additional information about the template. In some examples, the constrained language compiler 210 may present different UI elements including a selectable tasks with one or more selectable icons to allow the user(s) 102 to explore different information associated with the modeling, as illustrated and discussed in FIGS. 5 and 6, below.

The constrained language compiler 210 may include any parser or ML model(s) used by the present system including the ML model(s) 208 and associated components and/or the natural language programming system 110. As described herein, the constrained language compiler 210 may include at least two semantic parsers that are used by the reasoning engine 214 to determine trigger concepts from the input text and determine frame sense for the input text.

The constrained language compiler 210 may include a neural semantic parser. The neural semantic parser may treat frame parsing as a multi-task problem involving related classification and generative tasks. For instance, given a sentence and a frame-triggering span, the model decomposes parsing into frame-sense disambiguation (multi-label classification), argument span detection (generative), and role-labeling (classification). Since these tasks are related, the neural semantic parser may use a joint multi-task encoder-decoder architecture, wherein the encoder layer is shared among the various tasks, with different decoders used depending on the task type. In some examples, the neural semantic parser may train the model(s) 208 on a 500K annotated frame sentences, available in an open domain frame database. By fine-tuning a pre-trained transformer-based language model (e.g., GPT2 or T5), the neural semantic parser model achieved the best results using T5 as the base encoder/decoder. As the user(s) 102 continues to provide input text, the parsing results may consider the additional context, which may help to disambiguate the correct frame sense.

The constrained language compiler 210 may include an embedding-based heuristic parser. To complement the neural semantic parser, which needs a large number of annotated examples for training, the embedding-based heuristic parser may use an unsupervised K-NN based approach for frame parsing that can work with a handful of examples per frame. The approach relies on word embeddings and computes the similarity between a frame embedding (constructed by aggregating embeddings for words in frame examples and trigger lemmas, specified in the frame definition) and the sentence embedding (approximated as the sum of embeddings for words in the sentence). The algorithm also detects argument spans using syntactic heuristics based on a dependency parse of the sentence. The embedding-based heuristic parser assigns a role for each span by considering how well the type of the span phrase matches the expected role type as inferred from frame examples (type similarity checking is also done using embeddings). As described herein, the ML model(s) 208 including the programming language component 212 and the reasoning engine 214 may use the constrained language compiler 210 to determine frame sense to generate semantic frames, generate templates, and generate additional slots labeled with frame arguments and/or roles to refine guidance for user input. In additional examples, the ML model(s) 208 may further refine guidance for user input by using the programming language component 212 to generate suggested slot-filler text to auto-complete a generated slot The programming language component 212 may train a statistical model to generate auto-complete slot-filler suggestions. To provide guidance for input text, the programming language component 212 may train and use a statistical model to generate suggested slot-filler text based on determining a statistical probability that the user(s) 102 may enter the suggested text to fill in a generated slot.

In some examples, the programming language component 212 may use specified frame semantics to filter out incompatible language model suggestions. In various examples, if a user is entering a word or a phrase that is not in the "constrained subset of English," the system including the programming language component 212 may suggest a semantically similar term(s) as the user is entering NL descriptions to guide the user into using constrained language.

The programming language component 212 may define a programming language for the domain. For example, a type of logic programming language like Prolog and Answer-Set Prolog. The executable programming language can be executed on a digital computer by the interpreter component 216 and all answers entailed by the program can be generated by the interpreter running the program on the digital computer. The programming language component 212 may include a logic programming language with novel semantics that can be executed on the digital computer by the interpreter component 216 (e.g., reasoning engine 214).

The programming language component 212 may not necessarily be defined by the executable software program, as described herein, and need not be a logic programming language, but the design of compiler that translates constrained language to an executable programming language would be a more difficult task if the natural language and the programming language were not carefully aligned in terms of their intended logical meaning. The present system may align the constrained language and programming language. In particular, the constrained language compiler 210 may include an executable logic programming language that can directly represent the logical semantics of a natural language like English.

The reasoning engine 214 may include an interpreter component 216. The interpreter component 216 may receive input natural language expressions and interpret natural language expressions into structured representation. The interpreter component 216 may receive outbound structured representation and interpret the structured representation into natural language expressions.

The reasoning engine 214 may present an API, rendered via any technical interface (e.g., REST, GraphQL, etc.) for any computer application to assert specific objects, concepts, properties, and relationships. The reasoning engine 214 may ask questions about the implications of those statements as logically implied by the original NL document.

In some examples, the reasoning engine 214 may receive one or more of executable programming language, list of structured statements, a criterion to satisfy, and/or goal to satisfy. In various examples, the reasoning engine 214 may determine a goal or criterion to be satisfied and/or met based on the executable programming language and/or the list of structured statements. The reasoning engine 214 may determine that portion of the list of structured statements that satisfies the goal and may determine to generate a prompt for user input based at least in part on the goal.

The reasoning engine 214 may include a database of source templates associated with a downstream application. For instance, the reasoning engine 214 may retrieve one or more domain-specific base templates to initiate user interaction. As described herein, a base template may express an incomplete statement and may include one or more words based on a statement type and one or more slots that the user(s) 102 may fill in with input text to complete the statement. A statement and/or base template may be labeled by any statement types that may be used by the reasoning engine 214 for selecting a base template that is relevant to the downstream application. The reasoning engine 214 may select templates from the database of source templates to present in the list of base templates. In some examples, the list of base templates may be based on the statement type(s) that is relevant to the downstream application and the list may be ordered based on the relevance. For instance, if the present system is integrated with a natural learning application setting and the prompt is asking a question about a story, the list of base templates may include templates for the statement type of goal clause (e.g., if/then, often when/then, etc.). In another instance, if the system is integrated with a smart thermostat application setting and the prompt is asking the user(s) 102 to provide thermostat settings, the list of base templates may include a template for the statement type of conditional rule (e.g., if/then). As described herein, the list of base templates may include only one base template based on the knowledge requested by the downstream application. In the example for the smart thermostat application setting, the reasoning engine 214 may also use domain templates for domain statement types for setting different thermostat rules including temporal rule, (e.g., if time is/then), master setting rule (e.g., if the thermostat is on, then set the minimum temperature to), conditional override rule, and the like.

In various examples, the reasoning engine 214 may use any portion of the domain data, source data, and/or annotated and unannotated corpora, stored in the data store 222, as input to train one or more model(s) 208.

The reasoning engine 214 may determine a trigger concept from the input text and instantiate semantic frames for the trigger concept, as described herein. In response to the user(s) 102 filling in a slot with input text, the reasoning engine 214 may process the input text, select a trigger concept, and determine frame sense for the trigger concept. In some examples, the reasoning engine 214 may use a set of syntactic heuristics to select the trigger concept with the widest scope at each interaction. The reasoning engine 214 may generate a semantic frame for a frame sense by instantiating a semantic frame structure and defining a predicate and one or more semantic arguments for the frame sense.

The reasoning engine 214 may use the constrained language compiler 210 to process input text to determine frame sense for the trigger concept. In some examples, based on various factors including training data available and downstream application, the reasoning engine 214 may determine to use one or more of two semantic parsers that may produce potentially competing interpretations. Based on parsing the input text, the reasoning engine 214 may receive one or more frame senses for the trigger concept and associated accuracy scores. Based on the accuracy score meeting an accuracy threshold, the reasoning engine 214 may generate a semantic frame for frame senses.

In some examples, the reasoning engine 214 may determine to use a transformer-based neural semantic parser. The model for the neural semantic parser may be fine-tuned using a corpus and annotated data. The reasoning engine 214 may apply the neural semantic parser on input data for a domain with large reusable base vocabulary, where large is defined by a training set size threshold (e.g., less than 50, greater than 10 k, greater than 100 k, etc.) for the particular model selected.

In additional and/or alternative examples, the reasoning engine 214 may determine to use an embedding-based parser. The model for the embedding-based parser may be trained using a smaller training data set relative to the training set for the neural semantic parser. Initially, the embedding-based parser may train a model with training data including structured representations with frame embeddings generated from minimal hand authored examples. The embedding-based parser may retrieve k-nearest frames based on an embedding match between the partial statement entered thus far. The embedding-based parser may incorporate declaratively specified mapping templates, to allow the parser to quickly adapt to a new domain. As the reasoning engine 214 use the embedding-based parser to generate new frames for applications, the reasoning engine 214 may receive user-corrected output of the embedding-based parser generated frame. The corrected output frames and/or the final structured representations with embedded frames may be used as training data to improve the parsing model. Accordingly, the present system including the reasoning engine 214 and the embedding-based parser may improve with use.

The reasoning engine 214 may continuously try to match user input to a possible statement as expressed in the target representation language. The possible statement may be incomplete template representations and may require additional input from the user to complete. The reasoning engine 214 may use machine learning models 208 including a series of classifiers (e.g. deep-learning based statistical models for concept disambiguation and slot-filling) that use the natural language data to select a potential statement and constrain potential arguments. In addition to the user input, the classifiers may use the background context (e.g., application, question prompt) that surrounds the text-to-structure mapping application, to perform more accurate concept recognition/disambiguation and slot filling.

In some examples, the reasoning engine 214 may perform processes to help generate templates and slot fillers. As described herein, the system may present natural language prompts to the user(s) 102 and conduct dialog sessions with the user(s) 102 to allow the system to understand the natural language content. The reasoning engine 214 may determine each partial statement as a natural language expression. As described herein, the reasoning engine 214 may generate frames for a trigger concept selected from input text. The programming language component 212 use the generated frames to generate templates. In some examples, the reasoning engine 214 may generate additional slots corresponding to frame arguments and the generated slots may be filled with argument text identified in the input text. In various examples, the reasoning engine 214 may generate additional empty slots corresponding to missing inputs. The reasoning engine 214 may use a sequence generator that operates over a pairing of the partially completed statement and any existing mappings between its elements and natural language data. The reasoning engine 214 may call the programming language component 212 to use a statistical text-plausibility model to generate suggested slot-filler text. The reasoning engine 214 may rank and filter the suggested slot-filler text.

The reasoning engine 214 may include a semantic converter component to collect the natural language expression for a completed statement once the user(s) 102 is finished and may map the natural language expression back to the target representation language statements that generated them. Each statement can then be composed to produce a final structured representation. The application then operates over the resulting structure (e.g. evaluates a query, takes an external action, updates the application state). In some examples, in response to user input for submitting an entry, the semantic converter may receive the set of instantiated semantic frames. The semantic converter may be domain-specific and may further process the frames if necessary. For instance, in a rule application setting, the semantic converter may convert the resulting frames into a horn-clause-like statement. In various examples, if the result of a submitted entry includes partial frame semantic parse of input text, the semantic converter may use domain-specific logic to further convert the frame semantic interpretation into usable data if needed.

In various examples, in response to user input for submitting an entry, the semantic converter may process the resulting structures to collect domain data and/or training data to improve various models used by the present system. The semantic converter may receive sets of instantiated semantic frames and may remove constants added to slots to create reusable templates.

The dialog component 218 may generate interactive dialog to guide the user by prompts or other interactions to verify the translated statements based on the input NL document. The dialog component 218 may prompt the user to verify the logical intent of natural language input by presenting the corresponding translated constrained language output.

In some examples, the dialog component 218 may determine that a user(s) 102 is entering a word or a phrase that is not in the "constrained subset of English," and the system may suggest a semantically similar term(s) as the user(s) 102 is entering NL descriptions to guide the user(s) 102 into using constrained language. The dialog component 218 may also communicate back to the user(s) 102 through logical, natural language expressions.

The dialog component 218 may engage with the user(s) 102 through interactive dialog, as described herein. The dialog component 218 may generate a user interface to engage in dialog sessions with the user(s) 102 by natural language expressions. The dialog component 218 may use one or more models and/or natural language parsers to process the input text from the user(s) 102. For instance, the user(s) 102 may type in input in natural language text, and the system may process the input and may present micro dialogs related to the input. The dialog component 218 may perform structure-to-text mapping for the system.

The dialog component 218 allows the computing device(s) 108 to engage in extended dialog sessions with an individual human user(s) 102 via the device(s) 104.

In some examples, the dialog component 218 may receive natural language natural language content and may process the natural language content. The dialog component 218 may process natural language content to generate a structured representation of the natural language content. The dialog component 218 may use one or more models and/or natural language parsers to process the natural language content and perform natural language understanding processes. The dialog component 218 may identify unknown concepts within the natural language content while processing the natural language content. In some examples, the dialog component 218 may generate a prompt about an unknown concept in the natural language content to acquire knowledge from the user(s) 102. The dialog component 218 may receive input text from the user(s) 102 and may use the ML model(s) 208 to generate a semantic frame structure for the unknown concept.

The application(s) 220 may include any downstream application using the ML model(s) 208 to interface with the user(s) 102. The application(s) 220 may store domain-specific data to provide context for generating templates and/or frame structures. In some examples, the application(s) 220 may also store domain-specific logic for the semantic converter to convert structured representation into usable data.

The application(s) 220 may use the ML model(s) 208 and the dialog component 218 to request structured input from the user(s) 102. The application(s) 220 may receive the resulting structure from the programming language component 212 and may operate over the resulting structure.

The data store 222 may store at least some data including, but not limited to, data collected from the ML model(s) 208 and associated components, the natural language programming system 110, the constrained language compiler 210, the programming language component 212, and the reasoning engine 214, including data associated with domain data, source data, knowledge base data, natural language data, general rule domain data and training data. In some examples, the data may be automatically added via a computing device (e.g., the computing device(s) 108, the device (s) 104). The domain data may include static rules data and generated inference rules data and may correspond to one or more context. In various examples, the static rules data may include a fixed collection of rules, the individual rules may be associated with a confidence level. The programming language component 212 and reasoning engine 214 may operate over a specific core theory of logical forms (e.g., logical predicates, functions, formulae) which can be interpreted by the parser, and the core theory data may include vocabulary data and any data to produce rules and/or templates that conform to the core-theory. For instance, if the core-theory uses a frame-slot structure (e.g. FrameNet) for representing concepts/relations, then the core theory data may include frame structure data, concept and relationship data, ontology data, and the like. Training data may include any portion of the data in the data store 222 that is selected to be used to train one or more model(s) 208. In additional and/or alternative examples, at least some of the data may be stored in a storage system or other data repository.

Figure 3:
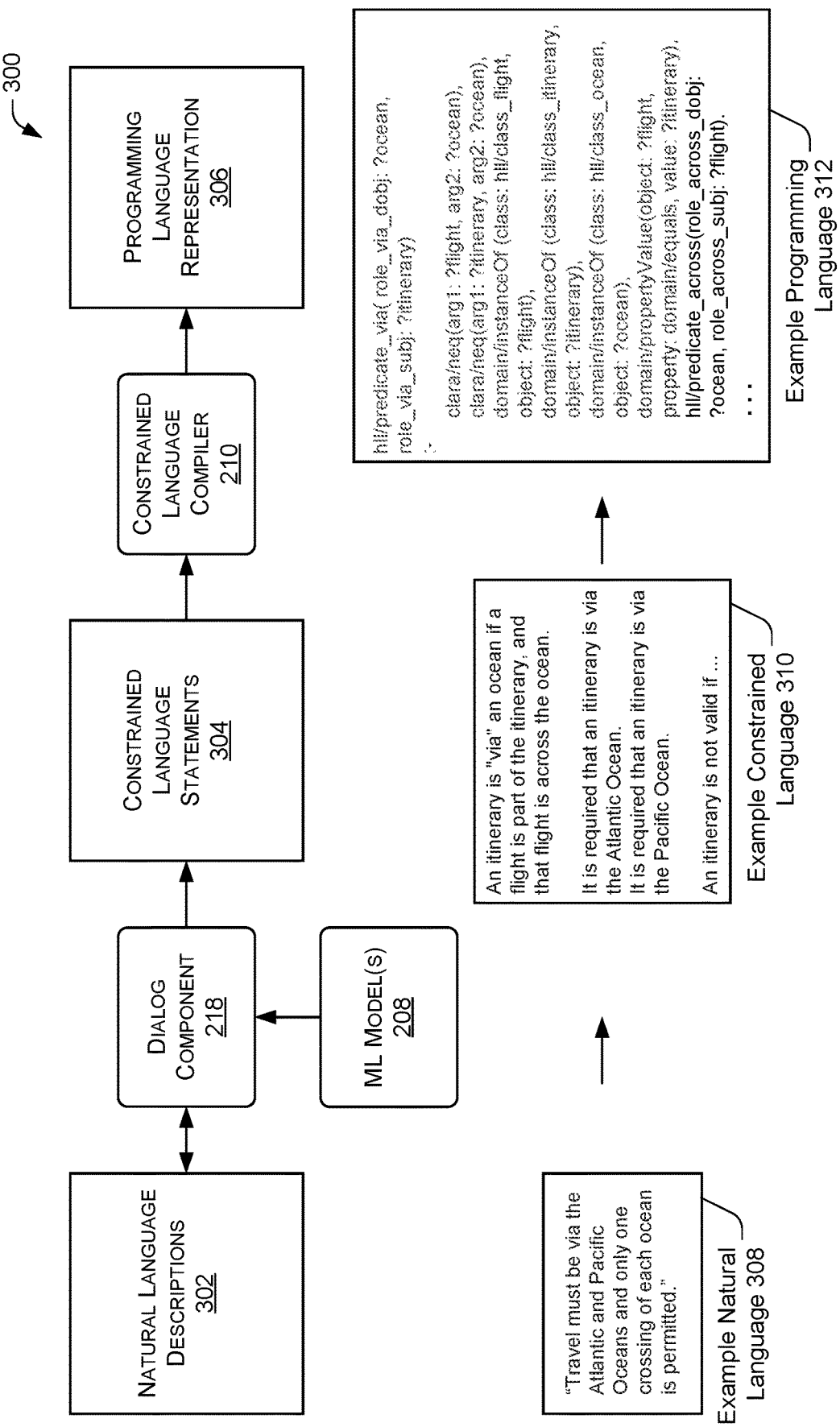
FIG. 3 is a block diagram of an example implementation of generating a machine learning model to translate natural language statements into constrained language statements.

FIG. 3 is a block diagram of an example implementation 300 of generating a machine learning model to translate natural language statements into constrained language statements. In some instances, the example implementation 300 may include an example natural language description 302, an example constrained language statements 304, an example programming language representation 306, an example natural language input 308, an example constrained language output 310, and an example programming language representation 312.

As a non-limiting example, the system may interact with a domain user via the dialog component 218 and receive the example natural language description 302, which is depicted by the example natural language input 308. The system may interact with the user(s) 102 via the dialog component 218 and receive the example natural language description 302, as depicted by the example natural language input 308.

The ML model(s) 208 may receive the example natural language description 302 and output the example constrained language statements 304, as depicted by the example constrained language output 310. As illustrated, the example constrained language output 310 is translated from the example natural language input 308. Although the example constrained language output 310 uses more words, the example constrained language output 310 is expressing the example natural language input 308 by using a constrained subset natural language. The example constrained language output 310 illustrates the translation of a NL description into constrained language statements.

The constrained language compiler 210 may compile the example constrained language statements 304 and output the example programming language representation 306, as depicted by example programming language representation 312. The example programming language representation 312 illustrates the compiling the constrained language statements into structured representations.

Figure 4:
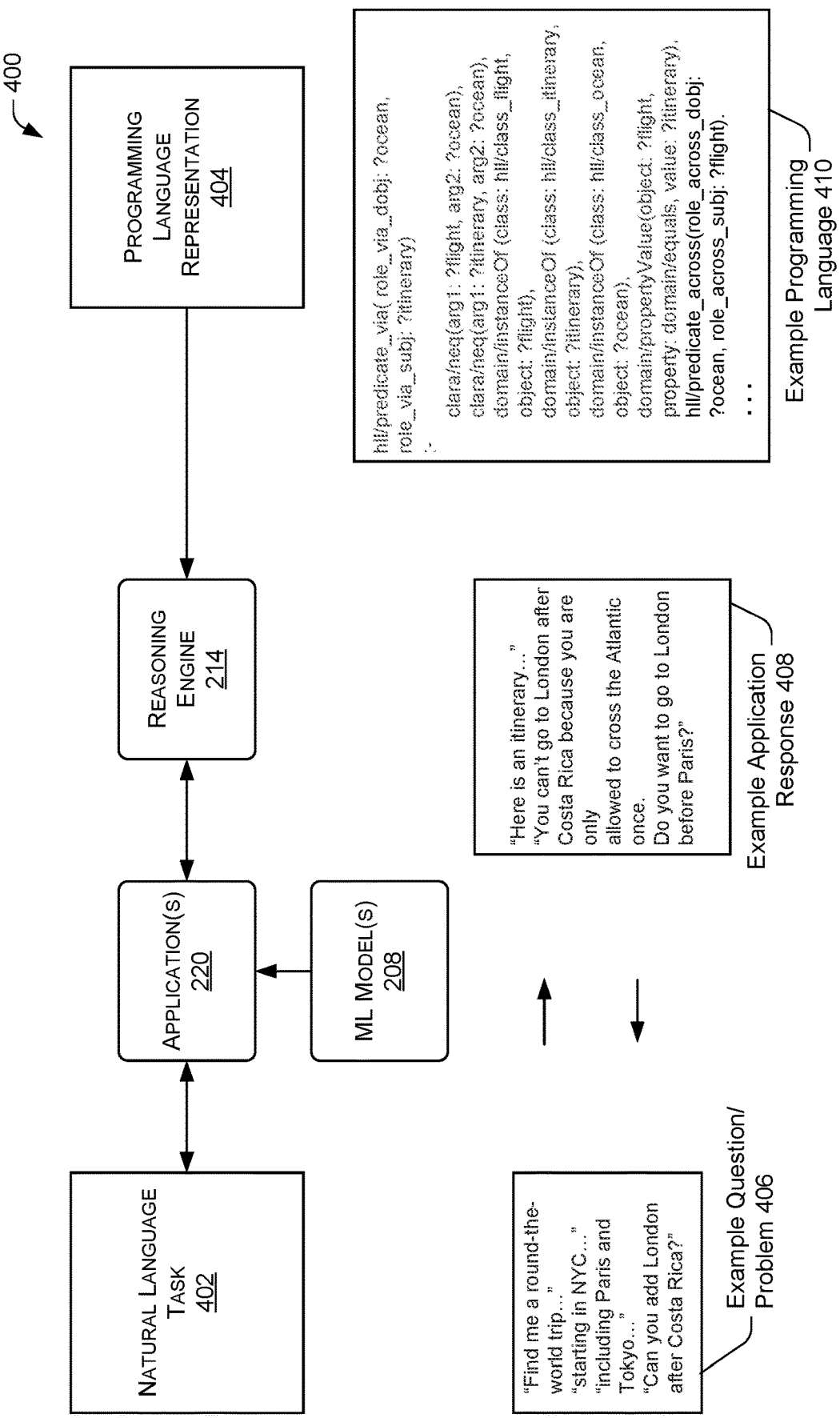
FIG. 4 is a block diagram of an example implementation of the natural language programming system configuring an executable program to integrate with an end-user application.

FIG. 4 is a block diagram of an example implementation 400 of the natural language programming system configuring an executable program to integrate with an end-user application. In some instances, the example implementation 400 may include an example natural language task 402, an example programming language representation 404, an example question/problem 406, an example application response 408, and an example programming language representation 410.

As a non-limiting example, the system may interact with an end-user via the application(s) 220 and receive the example natural language task 402, which is depicted by the example question/problem 406. The system may receive the example programming language representation 404 and execute the example programming language representation 410 with the reasoning engine 214 to determine the appropriate response, as depicted by the example application response 408.

Figure 5:
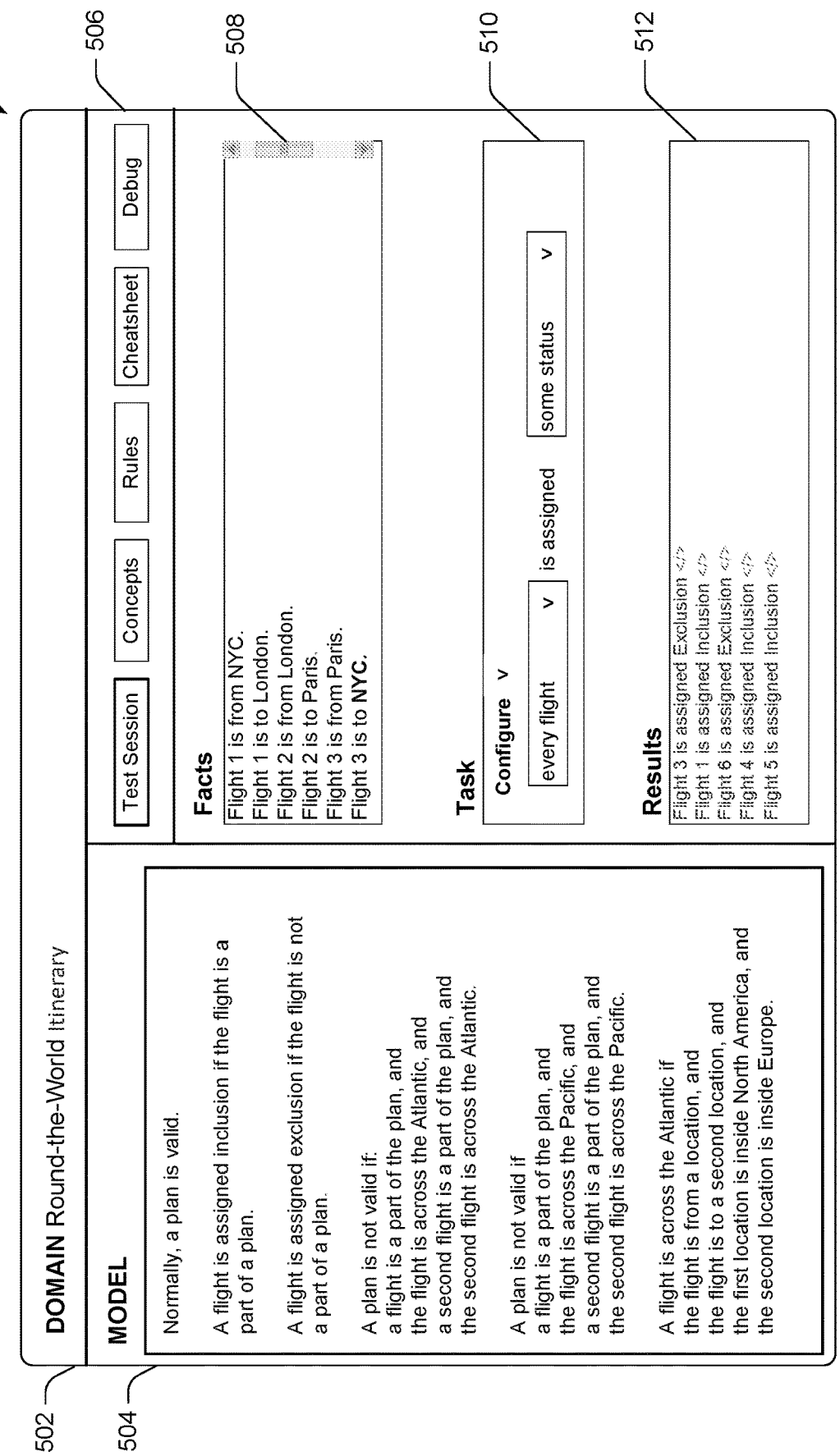
FIG. 5 illustrates an example user interface of the present disclosure for receiving natural language input to configure a model for a domain.

FIG. 5 illustrates example user interfaces (UI) 500 of the present disclosure for receiving natural language input to configure a model for a domain. In some instances, the example UI 500 may present a UI to interface with the user(s) 102. The example UI 500 may include example UI elements 502, 504, 506, 508, 510, and 512.

In a non-limiting example, the natural language programming system 206 may generate the example UI 500 to guide a domain user to generate a domain model.

The example UI element 502 may define the current domain as "Round-the-World Itinerary." In the present example, as depicted in the example UI element 602, the user(s) 102 has decided to generate a model to declare objects associated with a world traveling plan.

The example UI element 504 may define some objects and rules of the model for the "Round-the-World Itinerary."

The example UI element 506 includes selectable buttons to modify and/or view the current domain model. As depicted, the user(s) 102 has selected "Test Session" to verify that the model works as intended.

The example UI element 508 indicates the "Facts" for the current model. The example UI element 510 indicates the "Task" for the current model. The example UI element 512 indicates the "Results" for the current model.

Figure 6:
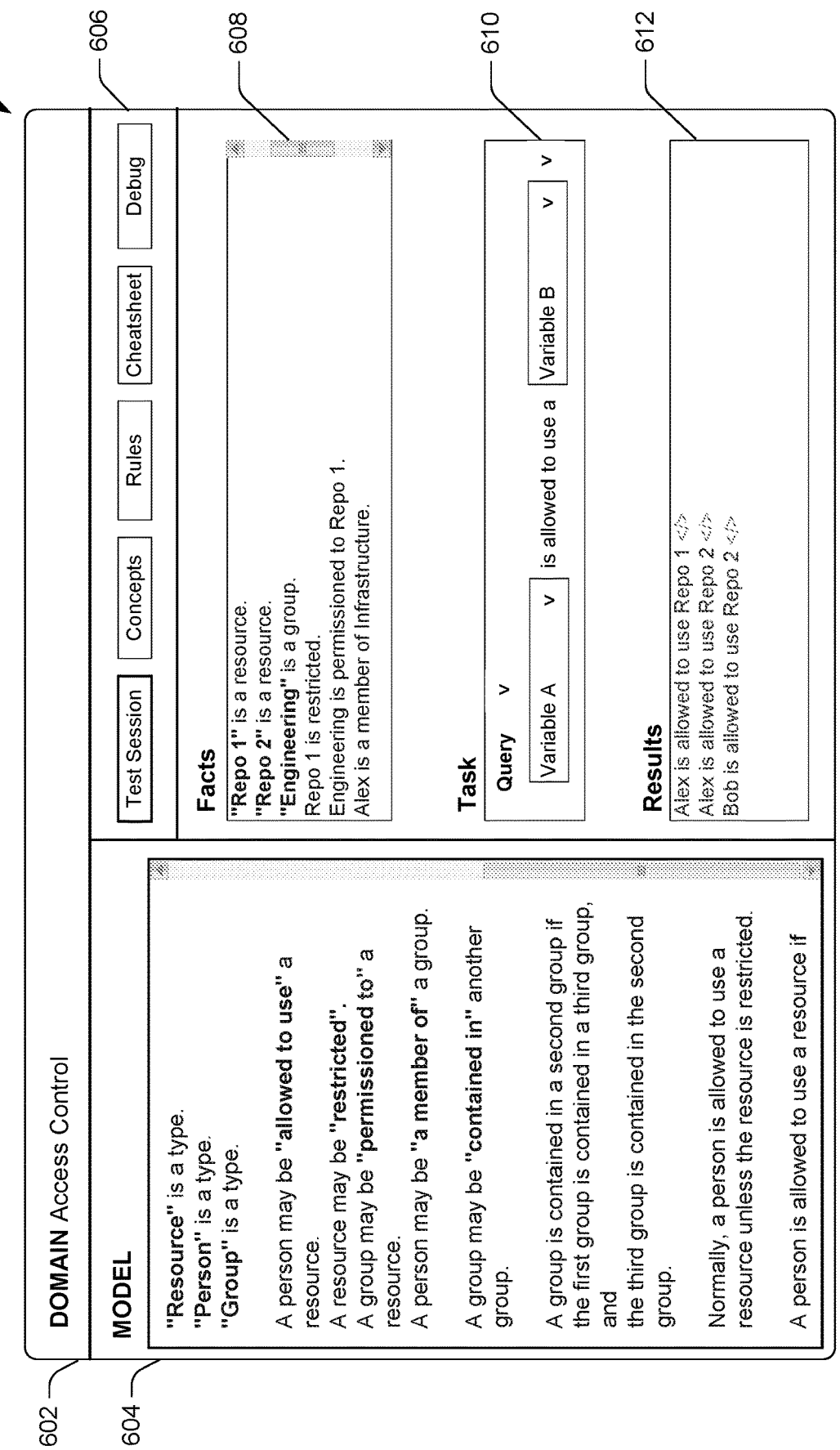
FIG. 6 illustrates an example user interface of the present disclosure for receiving natural language input to configure a model for another domain.

FIG. 6 illustrates example user interfaces (UI) 600 of the present disclosure for receiving natural language input to configure a model for another domain. In some instances, the example UI 600 may present a UI to interface with the user(s) 102. The example UI 600 may include example UI elements 602, 604, 606, 608, 610, and 612.

In a non-limiting example, the natural language programming system 206 may generate the example UI 600 to guide a domain user to generate a domain model.

The example UI element 602 may define the current domain as "Access Control." In the present example, as depicted in the example UI element 602, the user(s) 102 has decided to generate a model to set network access control.

The example UI element 604 may define some types, relationships, and rules of the model for "Access Control."

The example UI element 606 includes selectable buttons to modify and/or view the current domain model. As depicted, the user(s) 102 has selected "Test Session" to verify that the model works as intended.

The example UI element 608 indicates the "Facts" for the current model. The example UI element 610 indicates the "Task" for the current model. The example UI element 612 indicates the "Results" for the current model.

Figure 7:
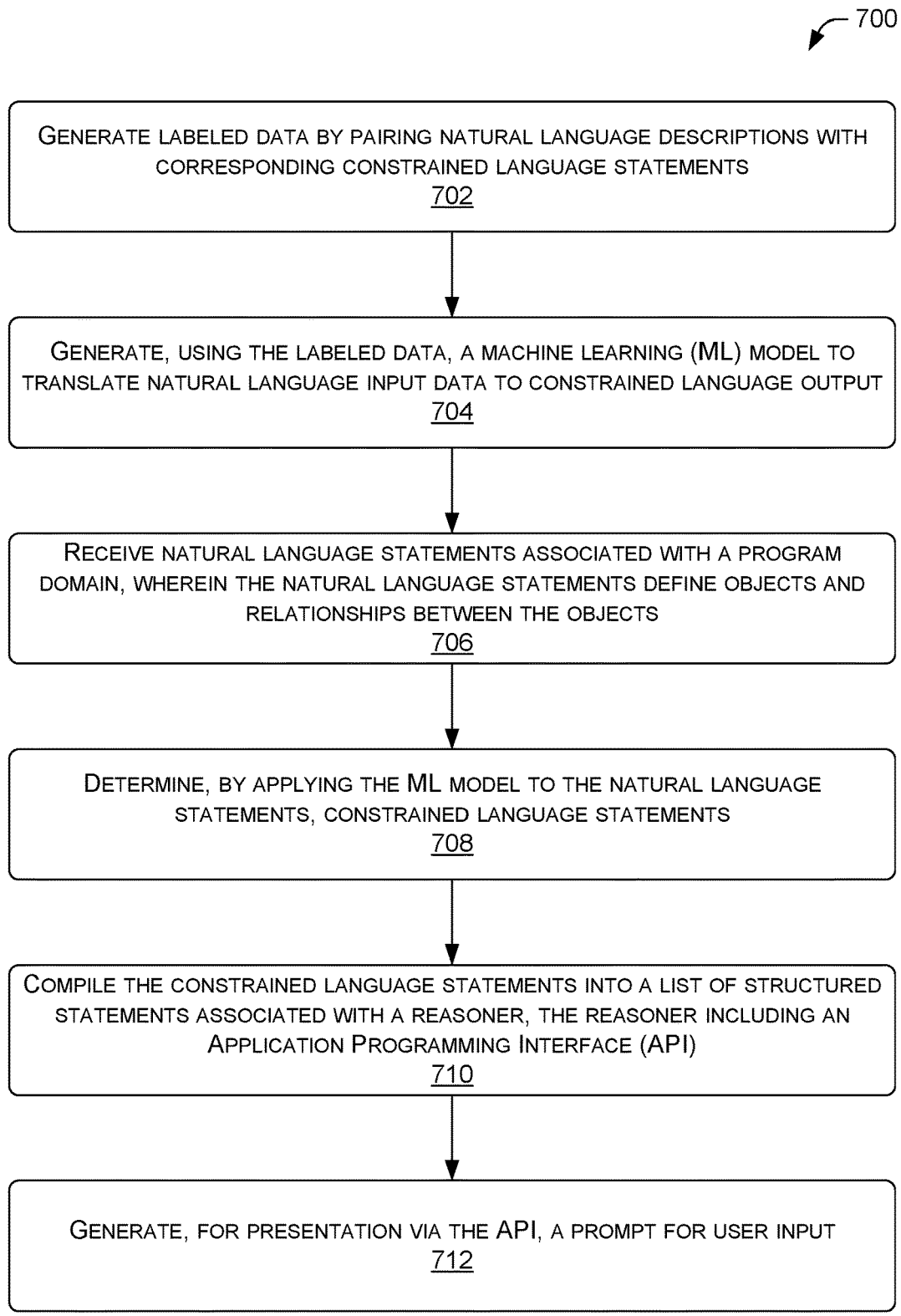
FIG. 7 illustrates an example process for a natural language programming system to configure a machine learning model to translate natural language input into constrained language output, as discussed herein.
Figure 8:
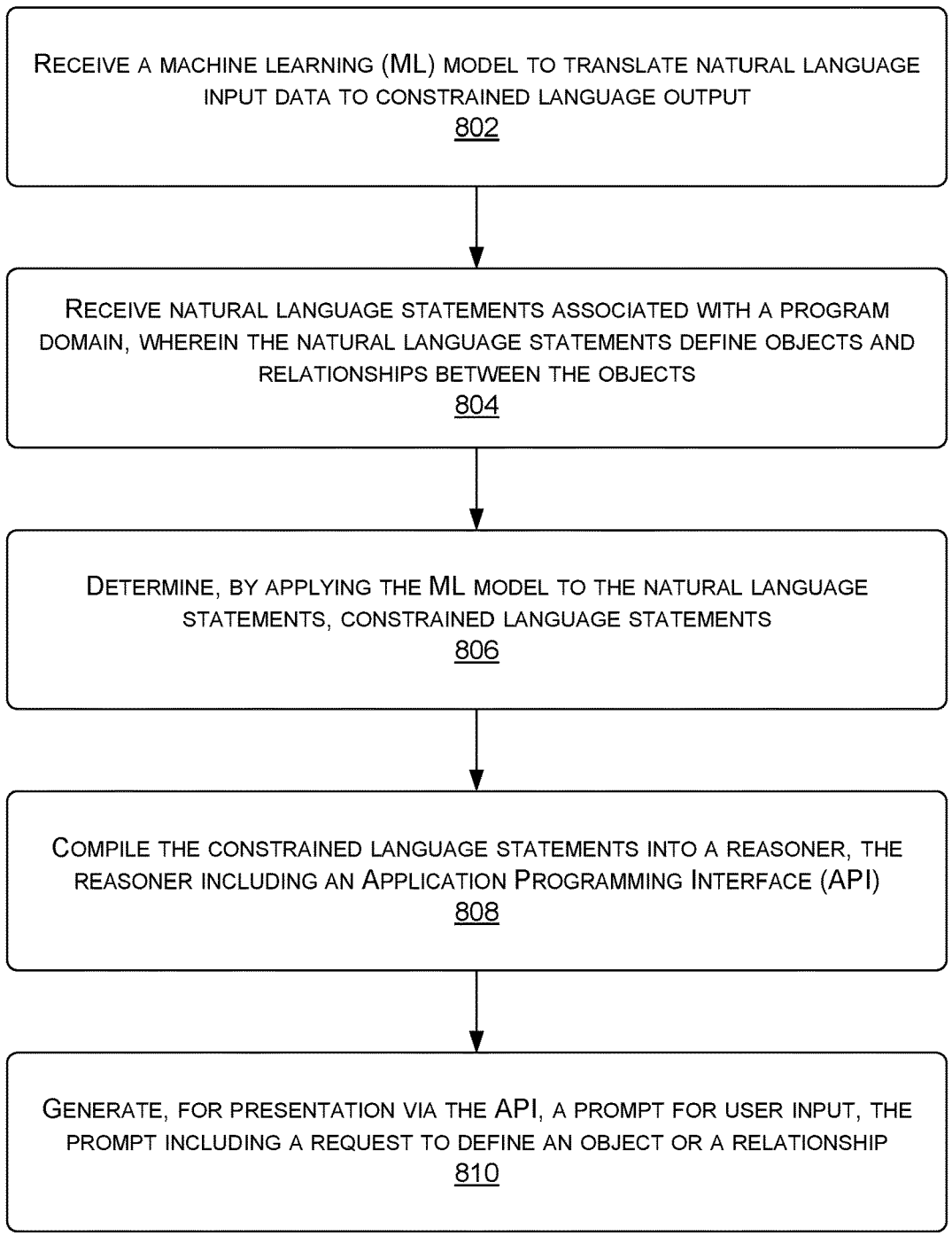
FIG. 8 illustrates an example process for a natural language programming system to use a machine learning model to translate natural language input into constrained language output, as discussed herein.

FIGS. 7 and 8 are flow diagrams of illustrative processes. The example processes are described in the context of the environment of FIG. 2 but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processors 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 7 is a flow diagram of illustrative process 700 for a natural language programming system to configure a machine learning model to translate natural language input into constrained language output, as discussed herein. The process 700 is described with reference to the system 100 and may be performed by one or more of the computing device(s) 108 and/or in cooperation with any one or more of the device(s) 104. Of course, the process 700 (and other processes described herein) may be performed in other similar and/or different environments.

At operation 702, the process may include generating labeled data by pairing natural language descriptions with corresponding constrained language statements. For instance, the computing device(s) 108 or the device(s) 104 may generate labeled data by pairing natural language descriptions with corresponding constrained language statements. As described herein, the system may generate, by training and/or prompting, one or more ML model(s) 208 using labeled data as training data. Machine learning generally involves processing a set of examples (called "training data" or "labeled data") to generate ("train" or "prompt") one or more ML model(s) 208.

At operation 704, the process may include generating, using the labeled data, a machine learning (ML) model to translate natural language input data to constrained language output. For instance, the computing device(s) 108 or the device(s) 104 may generate, using the labeled data, a machine learning (ML) model to translate natural language input data to constrained language output. As described herein, the system may generate machine learning (ML) models ("ML models" or "translator models") to translate natural language input into constrained language output. The ML models may be generated by using labeled data. The labeled data ("labeled data" or "training data") may include natural language descriptions paired with corresponding constrained language statements. In the present system, the constrained language is a constrained subset of natural language, which allows the constrained language statements to be read and understood as plain English. Additionally, the constrained subset of natural language allows the system to define specific words as having unambiguous meaning. Accordingly, the system generates constrained language statements that are semantically unambiguous.

At operation 706, the process may receiving natural language statements associated with a program domain, wherein the natural language statements define objects and relationships between the objects. For instance, the computing device(s) 108 or the device(s) 104 may receive natural language statements associated with a program domain, wherein the natural language statements define objects and relationships between the objects. As described herein, the At operation 708, the process may include determining, by applying the ML model to the natural language statements, constrained language statements. For instance, the computing device(s) 108 or the device(s) 104 may determine, by applying the ML model to the natural language statements, constrained language statements. As described herein, the At operation 710, the process may include compiling the constrained language statements into a list of structured statements associated with a reasoner, the reasoner including an application programming interface (API). For instance, the computing device(s) 108 or the device(s) 104 may compile the constrained language statements into a list of structured statements associated with a reasoner, the reasoner including an application programming interface (API). As described herein, the constrained language compiler 114 may receive a prompt from the system and the prompt may include any form of a request for information including questions about natural language input, instructions to define one or more of objects, classes of object, subclasses of classes, taxonomies/hierarchies, properties of objects, relationships between objects, qualities, implicatures, conditions, defaults, exceptions, randomness, and the like. To initiate interaction with the user(s) 102, the constrained language compiler 114 may generate a reasoner with an API. The reasoner API may be configured to enable: (1) user input of assertions naming properties, relationships, conditions, rules, constraints about a specific set of objects and their relationships; (2) posing of questions; and (3) the collection of answers to posed questions that are logically implied by the original NL document.

At operation 712, the process may include generating, for presentation via the API, a prompt for user input. For instance, the computing device(s) 108 or the device(s) 104 may generate, for presentation via the API, a prompt for user input.

FIG. 8 is a flow diagram of illustrative process 800 for a natural language programming system to use a machine learning model to translate natural language input into constrained language output, as discussed herein. The process 800 is described with reference to the system 100 and may be performed by one or more of the computing device(s) 108 and/or in cooperation with any one or more of the device(s) 104. Of course, the process 800 (and other processes described herein) may be performed in other similar and/or different environments.

At operation 802, the process may include receiving a machine learning (ML) model to translate natural language input data to constrained language output. For instance, the computing device(s) 108 or the device(s) 104 may receive a machine learning (ML) model to translate natural language input data to constrained language output. As described herein, the ML model(s) 208 may receive natural language input from the user(s) 102 and translate the input to constrained language output.

At operation 804, the process may include receiving natural language statements associated with a program domain, wherein the natural language statements define objects and relationships between the objects. For instance, the computing device(s) 108 or the device(s) 104 may receive natural language statements associated with a program domain, wherein the natural language statements define objects and relationships between the objects. As described herein, the ML model(s) 112 may receive and translate natural language statements associated with a program domain into constrained language statements. In some examples, the ML model(s) 112 may receive natural language input from the user(s) 102 and translate the input into constrained language statements.

At operation 806, the process may include determining, by applying the ML model to the natural language statements, constrained language statements. For instance, the computing device(s) 108 or the device(s) 104 may determining, by applying the ML model to the natural language statements, constrained language statements. As described herein, the ML model(s) 208 may determine, by applying the ML model to the natural language statements, constrained language statements, wherein the ML model is configured to receive input NL statements and output constrained language statements.

At operation 808, the process may include compiling the constrained language statements into a reasoner, the reasoner including an application programming interface (API). For instance, the computing device(s) 108 or the device(s) 104 may compile the constrained language statements into a reasoner, the reasoner including an application programming interface (API). As described herein, the constrained language compiler 210 may output executable programming language and/or a "reasoner" with an API. The reasoner API may include UI elements to interact with the user(s) 102. The constrained language was designed to enable the expression of a very rich set of logical concepts found in both formal logical programming language as well as in natural language, including but not limited to: objects, classes of object, subclasses of classes, taxonomies/hierarchies, properties of objects, relationships between objects, qualities, implicatures, conditions, defaults, exceptions, randomness, normality, and the like.

At operation 810, the process may include generating, for presentation via the API, a prompt for user input. For instance, the computing device(s) 108 or the device(s) 104 may generate, for presentation via the API, a prompt for user input. As described herein, the constrained language compiler 210 may present a prompt to request assertion from the user(s) 102 by user input.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more processors; and
non-transitory computer-readable media storing computer-executable instructions that, when executed by the one or more processors, cause the one or more processors to perform operations comprising:
generating labeled data by pairing natural language descriptions with corresponding constrained language statements, wherein the corresponding constrained language statements express the natural language descriptions by using a constrained subset of natural language words;
generating, using the labeled data, a machine learning (ML) model to translate natural language input data to constrained language output;
receiving natural language statements associated with a program domain, wherein the natural language statements define objects and relationships between the objects;
determining, by applying the ML model to the natural language statements, constrained language statements;

compiling the constrained language statements into a list of structured statements associated with a reasoner, the reasoner including an application programming interface (API);
generating, for presentation via the API, a prompt for user input; and
receiving, via the API, the user input.

2. The system of claim 1, wherein the natural language statements further define at least one condition, default, or exception associated with the program domain.

3. The system of claim 1, wherein the natural language statements further define one or more of a class of the objects, a subclass of the class, or a property of the objects.

4. The system of claim 1, wherein compiling the constrained language statements into the list of structured statements includes:
determining, based at least in part on the constrained language statements, a goal to satisfy for the program domain; and
determining, using the reasoner, a portion of the list of structured statements that satisfies the goal, wherein the prompt for the user input is based at least in part on the goal to satisfy.

5. The system of claim 1, the operations further comprising:
determining, by using an interpreter on the user input, a structured representation of the user input; and
determining, based at least in part on the structured representation, one or more assertions naming an object, a property, a relationship, a condition, a rule, or a constraint associated with the object or the relationship.

6. The system of claim 1, the operations further comprising:
determining, using the reasoner and based at least in part on the user input, a response to request assertions of an object or a relationship between the objects; and
transmitting, via the API, the response.

7. The system of claim 1, wherein the program domain includes an application, a knowledge database, or a query system.

8. A method, comprising:
receiving a machine learning (ML) model to translate natural language input data to constrained language output;
receiving natural language statements associated with a program domain, wherein the natural language statements define objects and relationships between the objects;
determining, by applying the ML model to the natural language statements, constrained language statements;
compiling the constrained language statements into a reasoner, the reasoner including an application programming interface (API); and
generating, for presentation via the API, a prompt for user input.

9. The method of claim 8, wherein the natural language statements further define one or more of a class of the objects, a subclass of the class, or a property of the objects.

10. The method of claim 8, wherein the prompt includes a request to define an object or a relationship, and further comprising:
receiving, via the API, the user input.

11. The method of claim 10, wherein compiling the constrained language statements includes:
generating a list of structured statements for the reasoner;
determining, based at least in part on the constrained language statements, a goal to satisfy for the program domain; and
determining, using the reasoner, a portion of the list of structured statements that satisfies the goal, wherein the prompt for the user input is based at least in part on the goal to satisfy.

12. The method of claim 10, further comprising:
determining, by using an interpreter on the user input, a structured representation of the user input; and
determining, based at least in part on the structured representation, one or more assertions naming an object, a property, a relationship, a condition, a rule, or a constraint associated with the objects and relationships.

13. The method of claim 10, further comprising:
determining, using the reasoner and based at least in part on the user input, a response to request assertions of an object or a relationship between the objects; and
transmitting, via the API, the response.

14. The method of claim 8, wherein the ML model is generated using labeled data including natural language descriptions paired with corresponding constrained language statements.

15. The method of claim 14, further comprising:
receiving, via the API, the user input; and
storing the user input for training data.

16. One or more non-transitory computer-readable media storing computer executable instructions that, when executed, cause one or more processors to perform operations comprising:
generating labeled data by pairing natural language descriptions with corresponding constrained language statements, wherein a constrained language statement of the corresponding constrained language statements is a semantically unambiguous interpretation of a corresponding natural language description of the natural language descriptions;
generating, using the labeled data, a machine learning (ML) model to translate natural language input data to constrained language output;
receiving natural language statements associated with a program domain, wherein the natural language statements define objects and relationships between the objects;
determining, by applying the ML model to the natural language statements, constrained language statements; and
compiling the constrained language statements into a list of structured statements for a reasoner.

17. The one or more non-transitory computer-readable media of claim 16, wherein the reasoner includes an application programming interface (API) and the operations further comprise:
generating, for presentation via the API, a prompt for user input; and
receiving, via the API, the user input.

18. The one or more non-transitory computer-readable media of claim 17, the operations further comprising:
determining, by using an interpreter on the user input, a structured representation of the user input; and
determining, based at least in part on the structured representation, one or more assertions naming an object, a property, a relationship, a condition, a rule, or a constraint associated with the object or the relationship.

19. The one or more non-transitory computer-readable media of claim 17, wherein receiving the natural language statements includes an interactive process including:
   determining, by applying the ML model to the natural language statements, a set of constrained language statements;
   presenting, via the API, the set of constrained language statements; and
   generating, for presentation via the API, a prompt for user input to verify the set of constrained language statements.

20. The one or more non-transitory computer-readable media of claim 19, the operations further comprising:
   receiving, via the API, the user input to correct at least a portion of the set of constrained language statements; and
   generating a second ML model with the labeled data and the user input to correct the at least the portion of the set of constrained language statements.

* * * * *